United States Patent [19]

Bayerkohler

[11] 3,729,033
[45] Apr. 24, 1973

[54] COMPACT PORTABLE TIRE SERVICING DEVICE

[75] Inventor: Weldon S. Bayerkohler, Okabena, Minn.

[73] Assignee: A. F. Scheppman and Son Mfg. Co., Okabena, Minn.

[22] Filed: Mar. 22, 1971

[21] Appl. No.: 126,581

[52] U.S. Cl. ......................141/231, 134/186, 141/38
[51] Int. Cl. ..............................................B65b 31/00
[58] Field of Search ........................118/50; 134/101, 134/103, 111, 169 A, 186; 141/38, 231; 137/205, 568, 574, 576, 581; 152/415; 184/1.5

[56] References Cited

UNITED STATES PATENTS

| | | | |
|---|---|---|---|
| 2,415,019 | 1/1947 | McMahan | 141/38 |
| 2,425,848 | 8/1947 | Vawter | 184/1.5 X |
| 2,702,092 | 2/1955 | Douglass | 134/169 A X |
| 3,448,745 | 6/1969 | Seeley | 138/101 |
| 2,652,181 | 9/1953 | Rupp | 141/38 X |

Primary Examiner—Houston S. Bell, Jr.
Attorney—Williamson, Palmatier & Bains, H. Dale Palmatier, Herman H. Bains and Malcolm L. Moore

[57] ABSTRACT

A compact portable tire servicing device comprises a base having ground engaging wheels upon which is supported a tank and a motor driven pump. A supply conduit is connected to the tank and is connectible to a reservoir which is adapted to contain a supply of calcium chloride solution. The liquid calcium chloride solution is pumped from the tank through an outlet conduit and is returned to the tank by return conduit. A control valve is interposed in flow controlling relation with respect to a filler conduit and the return conduit thus permitting the liquid to be supplied to the tire and to be evacuated therefrom. The tank is compartmented and the pump is positioned below the tank and below the connection of the return conduit to the tank so that the system is self-priming and the pump is flooded continuously.

2 Claims, 5 Drawing Figures

Patented April 24, 1973 3,729,033

INVENTOR.
Weldon S. Bayerkohler
BY
Williamson, Palmatier
& Bains ATTORNEYS

Patented April 24, 1973

INVENTOR.
Weldon S Bayer Kohler
BY
Williamson, Palmatier
& Bains ATTORNEYS 3,729,033

COMPACT PORTABLE TIRE SERVICING DEVICE

SUMMARY OF THE INVENTION

Although there are certain commercial type servicing systems, most of these systems are permanent installations and the presently available portable systems are quite bulky and cumbersome. It is therefore a general object of this invention to produce a small compact portable tire servicing device in which the components are all conveniently mounted on a wheel supported chassis so that the device may be conveniently moved as desired. The pump of the tire servicing device may be readily primed by merely tilting the device. Further, the tire servicing device includes a tank connectible by a suitable conduit to a reservoir of calcium chloride solution, the tank being positioned above the level of the pump so that the pump is constantly flooded, thereby minimizing wear and damage to the pump.

This device allows the filling of fluid and the evacuation of fluid and air from the tires without switching hoses or connections and eliminates the need of a by-pass hose to the fluid reservoir. The unique arrangement of pump, siphon ejector valve and two compartment tank permits evacuation of air from the tire without having the air go through the pump. This contributes to substantially longer pump life as the pump is cooled and lubricated by the constant flow of fluid passing through the pump.

These and other objects and advantages of this invention will more fully appear from the following description made in connection with the accompanying drawings wherein like reference characters refer to the same or similar parts throughout the several views.

DETAILED SUMMARY OF THE INVENTION

Figure 1:
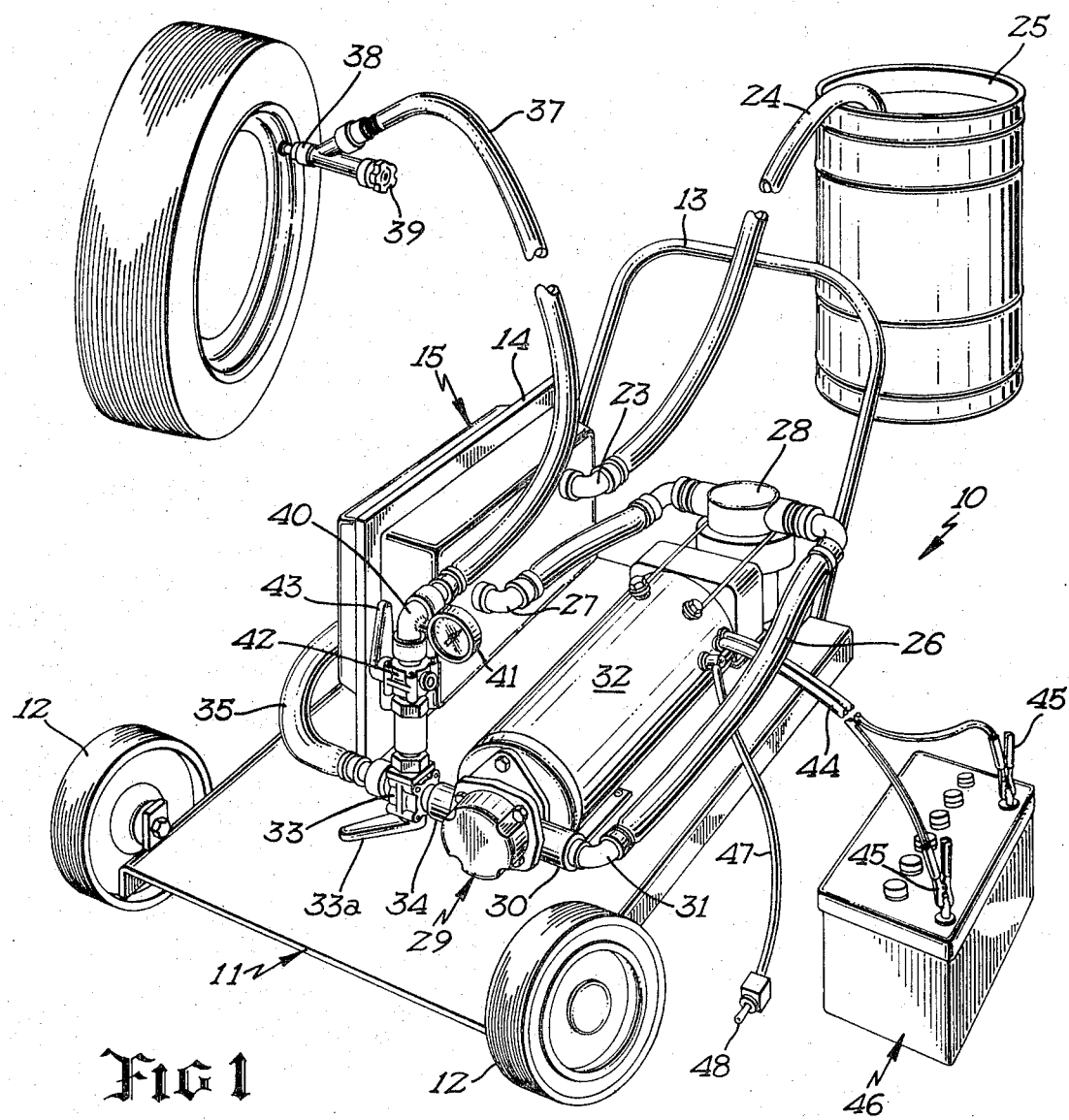
FIG. 1 is a perspective view of a novel portable tire servicing device.
Figure 2:
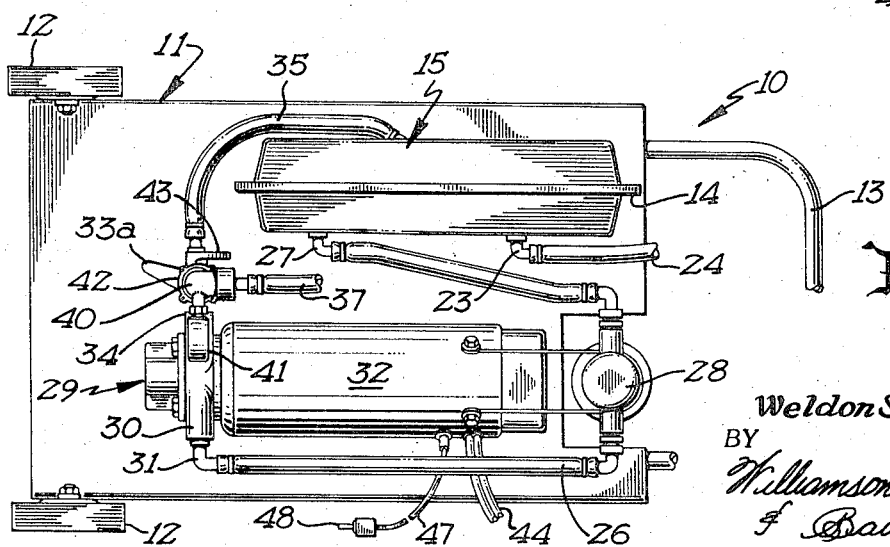
FIG. 2 is a top plan view thereof.

Referring now to the drawings and more specifically to FIG. 1, it will be seen that one embodiment of the novel tire servicing device, designated generally by the reference numeral 10, is there shown. The tire servicing device 10 includes a generally rectangular shaped base or chassis formed of a suitable metal and having a pair of ground engaging wheels 12 secured thereto adjacent the front corners thereof. It is pointed out that the wheels are mounted on the base only slightly above ground level so that the unit rests on the base 11 and wheels when in use and in an untilted substantially horizontal condition. When the handle is raised to tilt the unit, only the wheels then contact the ground surface for ease or portability. A generally U-shaped handle 13 is affixed to the rear portion of the base 11 and projects upwardly and rearwardly therefrom.

The base 11 serves to mount a plurality of the various components of the tire servicing device thereon and to this end, the base has a vertically oriented small compartmented tank 15 mounted thereon and it will be noted that the tank 15, in the embodiment shown, is of generally rectangular configuration. The tank 15 which is mounted on one side of the base includes an upper wall 16, a lower wall 17, end walls 18, and side walls 19.

The tank 15 is formed from a suitable plastic in a molding operation wherein the tank is comprised of two identical molded parts. It will be seen that each part of the tank has an outturned flange 14 integral with the respective end, lower and upper wall portions thereof. The flanges are joined together by a suitable adhesive and the tank is mounted on the base by means of said flange. The end walls and side walls actually constitute upstanding peripheral walls, and it will be noted that the flange 14 mounts the tank so that lower wall 17 thereof is placed substantially above the upper surface of the base 11.

The tank 15 has a divider wall 20 affixed to the respective inner surfaces of the upper wall 16 and side walls 19 and this divider wall extends transversely of the tank but terminates adjacent but spaced from the bottom wall 17. The divider wall 20 serves to divide the interior of the tank in a chamber 21 and a chamber 22 and these chambers intercommunicate with each other adjacent their lower portions.

The tank 15 has an opening therein to which is connected a fitting 23 which in turn is connected to one end of an elongate supply conduit 24. The other end of the supply conduit 24 extends into and communicates with the interior of a reservoir 25, which in the embodiment shown, comprises a barrel. The barrel 25 is adapted to contain calcium chloride solution and it is important to point out that the barrel requires no covers since the present system is capable of drawing the liquid from an open top container. It will also be noted that the fitting 23 is connected to the tank so that it intercommunicates with the chamber 21.

A fitting 27 is connected to another opening in the tank 15 and this fitting 27 is also connected to one end of an elongate outlet conduit 26. The outlet conduit 26 has a filter 28 interposed in flow controlling relation therein which serves to filter the liquid chloride solution as it is discharged from the tank 15. In the embodiment shown, the outlet conduit 26 intercommunicates with the chamber 22, and it will be noted that the connection between the conduit 26 and the tank 15 is located at a lower level than the connection between the supply conduit 24 and the tank 15.

The other end of the outlet conduit 26 is connected by a fitting 31 to the inlet 30 of a pump 29. The pump 29 is provided with a suitable electric motor 32 for driving the pump, and a control valve 33 is connected in flow controlling relation with respect to the outlet 34 of the pump 29. The control valve 33 has an actuating handle 33a which is shiftable between a fill position and an evacuation position.

One end of an elongate return conduit 35 is connected to the control valve 33 and the other end of this return conduit is connected by a fitting 36 to the tank 15. It will be noted that the connection between the return conduit 35 and the tank 15 is located at a lower level than the connection between the outlet conduit 26 and the tank 15. Further, the return conduit 35 intercommunicates with the chamber 21 adjacent the bottom thereof so that the liquid calcium chloride solution will constantly flow by action of gravity through the return conduit 35 and into the pump when the pump 29 is not energized.

One end of an elongate filler conduit 37 is interconnected to the control valve, and the other end of this filler conduit has a discharge nozzle 38 thereat which is especially adapted for connection to the conventional valve of vehicle tires such as the valve of the tractor tire T.

The filler conduit 37 is actually connected to a T-fitting 40 which in turn is connected to the control valve 33. One branch of the T-fitting 40 has a gauge 41 mounted thereon, and a valve 42 is interposed in flow controlling relation with respect to the T-fitting 40. The valve 42 when closed permits an operator to isolate the tire and filler conduit from the remaining portion of the system. With this arrangement, the pressure of the tire may be readily read from the gauge 41. Normally, the valve 42 will be maintained in an open condition. The valve 42 is provided with a manually operable actuating handle 43 to facilitate ready opening and closing of this valve.

Suitable electrical conductors 44 for the electric motor 32 are provided with electric clips at their free ends so that the clips can be readily attached to the electrodes of a conventional wet cell storage battery 46. Thus the motor 32 is adapted to be connected to a source of direct electric current to be operated thereby which again is a departure from the conventional systems. Ordinarily, the pumps and other various components of the conventional tire servicing devices require AC current, compressed air motors, or gasoline engines for operation thereof. In the present system, a storage battery may be provided as a component of the device, or the unit may be operated from the storage battery of a conventional vehicle such as a tractor, truck or the like. Suitable conductors 47 are also provided in the electric circuit for the motor 32 and these electric conductors are connected to a switch 48, which is shiftable between on and off positions.

In operation, the tire servicing device will be moved to the desired location and the calcium chloride solution may be prepared at the location in the barrel 25 or other type reservoir. The tank 15 will contain a predetermined amount of the liquid chloride solution, and this solution will flow by action of gravity through the return conduit to flood the pump 29. This flooding action will take place even though only a small amount of fluid is in the tank 15.

Figure 3:
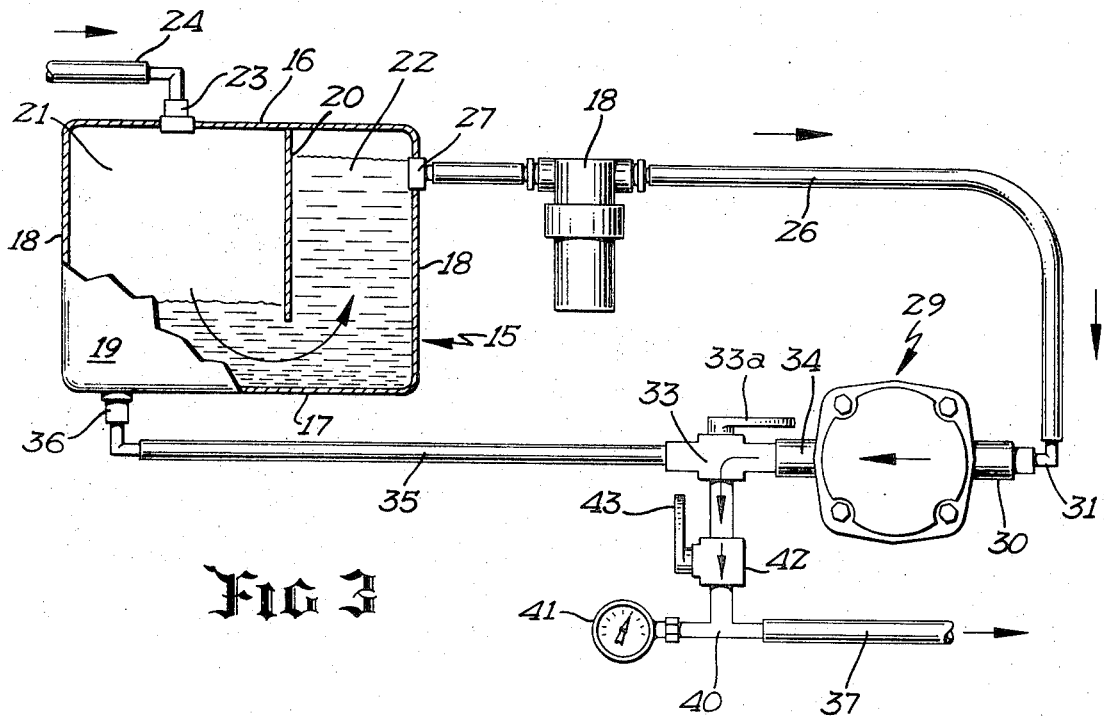
FIG. 3 is a diagrammatic view of the components of the tire servicing device illustrating the direction of flow during the fill cycle.
Figure 4:
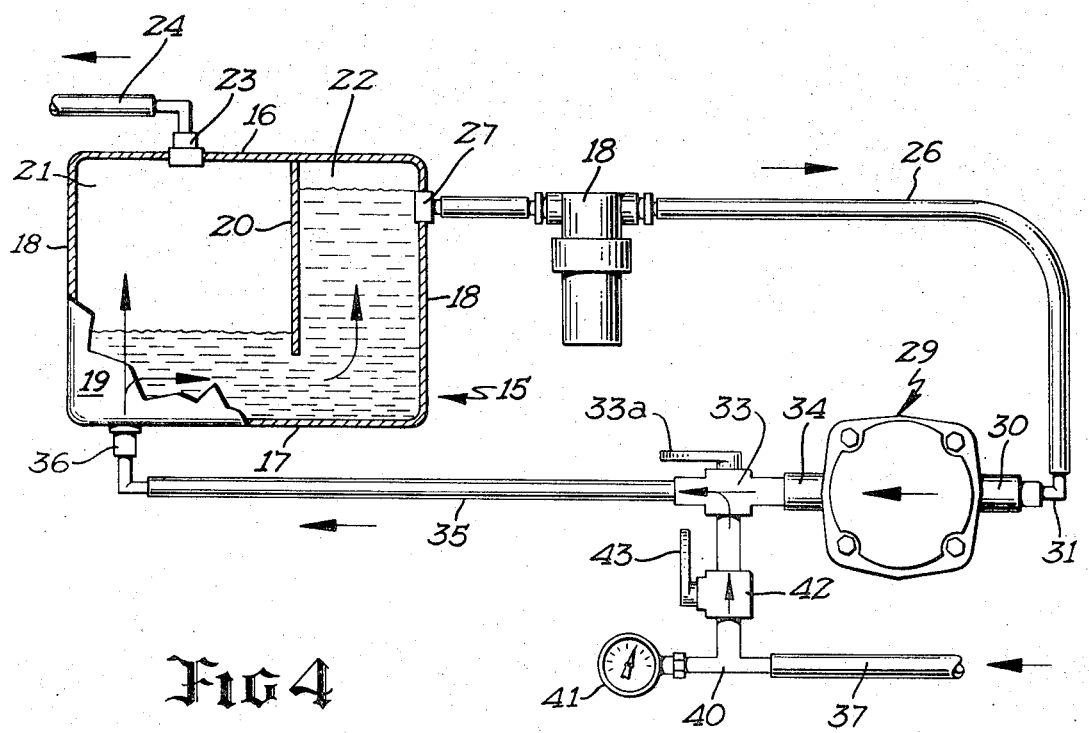
FIG. 4 is a diagrammatic view similar to FIG. 3 but illustrating the direction of flow during evacuation cycle.
Figure 5:
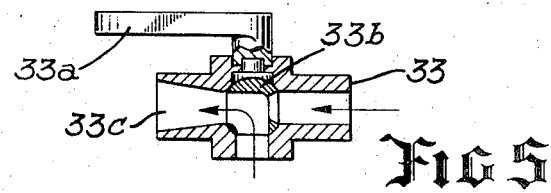
FIG. 5 is a diagrammatic view of the valve in an evacuation condition.

In the event that only a very small amount of solution is in the tank 15, the pump may be quickly primed by tilting the tire servicing device in a forward direction. This may be accomplished by raising the rear end portion of the chassis 11 by grasping and raising the handle 13. When this occurs, the liquid within the tank will flow into the chamber 22 since this chamber will be tilted downwardly whereby the liquid will flow through the outlet conduit 26 and into the pump 29. When the pump is primed, the switch 48 may be closed so that the liquid will be pumped from the chamber 22 through the conduit 26 and through the filler conduit 37 to the tire during the fill cycle. It is pointed out that the handle 33a will be positioned as shown in FIG. 3 so that the return conduit 35 is closed with respect to the pump outlet and with respect to the filler conduit 37. A negative pressure will be produced in the chamber 21 and cause the liquid within the reservoir 25 to flow into the tank 15. It will be noted that the liquid level in the chamber 22 is higher than the liquid level in the chamber 21 so that no air will pass into the pump during this cycle. The pump will be operated until the desired amount of liquid is pumped into the tire, at which time the switch 48 may be opened to de-energize the motor and pump. The tire may thereafter be supplied with its desired amount of air from a source of air under pressure. Again it is pointed out that in the de-energized condition, the pump 29 will be flooded with the liquid because of its position relative to the return conduit 35. However, lever 33a must be in the position illustrated in FIG. 4 during storage to permit flooding of the pump.

When it is desired to evacuate the liquid and air from the tire, the tire servicing device will again be tilted to assure that the liquid within the tank 15 will fill the chamber 22 and flow outwardly through the outlet conduit 26, thereby eliminating the chance of air being pulled through the pump. The handle 33a will be moved to the position illustrated in FIG. 4. to intercommunicate the return conduit with the filler conduit and with the outlet of the pump. The switch 48 will be energized, thus causing the liquid to be pumped through the outlet conduit 26 and through the return conduit 35. When this occurs, a negative pressure is produced thus causing the liquid to flow through the filler conduit and into the return conduit 35. It will be seen that valve 33 is provided with a venturi between the valve spool and the hose 35 whereby the valve functions as a siphon, ejector or eductor valve during evacuation. The liquid will again assume the position illustrated in FIG. 4 thus permitting air to be introduced into the chamber 21 and outwardly through the supply conduit 24. This is possible since the connection between the supply conduit 24 is located at a higher level than the connection between the outlet conduit and the tank 15. Air will be evacuated along with the liquid, and after all of the air has been removed, the liquid will fill the tank 15 and thereafter flow into the barrel or other reservoir 25. During this entire operation, no air is pumped though the pump because of the construction of the tank 15 and because of the connections of the various conduits with respect to the tank.

The divider wall 20 serves to permit the pump to be nicely primed by merely tilting the chassis in a forward direction and also precludes the chance of air being forced through the pump. Further, the chambered tank also eliminates the need of a special air receptacle or by-pass hose to the reservoir which is necessary in other types of tire servicing devices. It will also be seen from the foregoing description that the pump is maintained in flooded condition while it is inoperative, thus minimizing corrosion to the pump.

Thus it will be seen that I have provided a novel tire servicing device which is not only of simple and inexpensive construction, but one which functions in a more efficient manner than any heretofore known comparable device.

What is claimed is:

1. A compact portable pumping and siphoning device for selectively dispensing and evacuating a liquid to and from a receptacle comprising a base, ground engaging wheels connected to said base for supporting the same for travel, an elongate handle secured to said base to facilitate movement of said device, a tank mounted on said base, said tank having an upper wall, a lower wall and upstanding peripheral walls, a motor driven pump having an inlet and an outlet, an electric circuit including a source of direct current and said motor driven pump, and including a switch for selectively energizing and de-energizing said electric circuit, a control valve connected in flow controlling relation with the outlet of said pump, said valve being adjustable between a fill and an evacuation position, a supply conduit having one end thereof connected in communicating relation with said tank adjacent the upper wall thereof and having its other end adapted to communicate with a reservoir of liquid, an elongate outlet conduit having one end thereof connected in communicating relation to the tank adjacent the upper wall thereof and having its other end connected in communicating relation with the inlet of said pump, the connection between said outlet conduit and said tank being located at a lower level than the connection between the supply conduit and said tank, said tank having a transverse wall extending transversely of the interior of the tank from the upper wall thereof to divide the interior of said tank into a pair of compartments, said compartments intercommunicating with each other adjacent the lower portion of said tank interior, said outlet conduit communicating directly with one of said chambers, and said supply conduit communicating directly with the other of said chambers.

2. The device as defined in claim 1 and a mounting plate for mounting said tank so the lower wall thereof is positioned above said pump whereby liquid will flow by action of gravity into said pump with the latter is de-energized.

* * * * *